United States Patent [19]

Neuman et al.

[11] Patent Number: 5,955,043
[45] Date of Patent: Sep. 21, 1999

[54] PRODUCTION OF SODIUM CARBONATE FROM SOLUTION MINE BRINE

[75] Inventors: Thomas H. Neuman, Salt Lake City, Utah; Richard W. Chastain, Lyman, Wyo.

[73] Assignee: Tg Soda Ash, Inc., Granger, Wyo.

[21] Appl. No.: 08/705,159

[22] Filed: Aug. 29, 1996

[51] Int. Cl.$^6$ ............................... C10D 7/12; C10D 7/24
[52] U.S. Cl. ...................... 423/206.2; 23/302 T; 423/421
[58] Field of Search ...................... 23/302 T; 423/262.1, 423/262.2, 421, 422

[56] References Cited

U.S. PATENT DOCUMENTS

| | | |
|---|---|---|
| 1,396,841 | 11/1921 | Hirschkind . |
| 1,853,275 | 4/1932 | Houghton et al. . |
| 1,911,794 | 5/1933 | Britton . |
| 2,049,249 | 7/1936 | Cunningham . |
| 2,133,455 | 10/1938 | Keene et al. . |
| 2,193,817 | 3/1940 | Houghton . |
| 2,388,009 | 10/1945 | Pike . |
| 2,625,384 | 1/1953 | Pike et al. . |
| 2,639,217 | 5/1953 | Pike . |
| 2,770,524 | 11/1956 | Seaton et al. . |
| 2,780,520 | 2/1957 | Pike . |
| 2,957,822 | 10/1960 | Frint . |
| 2,962,348 | 11/1960 | Seglin et al. . |
| 2,970,037 | 1/1961 | Caldwell et al. . |
| 2,989,369 | 6/1961 | Osborne . |
| 3,028,215 | 4/1962 | Frint . |
| 3,037,849 | 6/1962 | Frint et al. . |

(List continued on next page.)

FOREIGN PATENT DOCUMENTS

| | | |
|---|---|---|
| 87-9599 | 12/1987 | South Africa . |
| 15822 | 7/1892 | United Kingdom . |
| 883202 | 11/1961 | United Kingdom . |
| 1 495 530 | 12/1977 | United Kingdom . |
| 2 098 973 | 12/1982 | United Kingdom . |

OTHER PUBLICATIONS

Butler, J.N., Carbon Dioxide Equilibria and Their Applications, Lewis Publishers, Chelsea, MI, pp. 30–39, 221, 1991.

Defensive Publication, *United States Patent Office*, "Process For Producing Crystalline Anhydrous Sodium Carbonate", T928,002, 1 page, Nov. 5, 1974.

Eickmeyer, A.G., "Carbon Dioxide Removal, IV, Catacarb", *Fertilizer Science Technology Series*, 2, pp. 165–169, 1974.

Garrett, D., "Solution Mining", *Natural Soda Ash*, Von Nostrand Reinhold, New York, NY, 1992, pp. 336–355.

Harned et al., "The Thermodynamics of Ionized Water in Sodium Chloride Solutions", vol. 57, pp. 1843–1876, Oct. 1935.

Mahajani et al., "The Stripping of $CO_2$ From Amine–Promoted Potash Solutions at 100° C", *Chemical Engineering Science*, vol. 38, No. 2, pp. 321–327, 1983.

Nii et al., "Regeneration of $CO_2$–Loaded Carbonate Solution By Reducing Pressure", *Journal of Chemical Engineering of Japan*, vol. 28, No. 2, pp. 148–153, 1995.

(List continued on next page.)

*Primary Examiner*—Gary P. Straub
*Attorney, Agent, or Firm*—Trask, Britt & Rossa

[57] ABSTRACT

A process for forming useful sodium salts by uniquely processing dilute mine brines obtained by solution mining of a sodium bicarbonate containing ore deposit with an aqueous solvent is disclosed. The dilute mine brine is reduced in sodium bicarbonate content to prevent precipitation of the sodium bicarbonate in subsequent crystallization of sodium carbonate decahydrate. The reduced mine brine is directed to a crystallizer operated to form pure sodium carbonate decahydrate crystals and a carbonate/bicarbonate containing mother liquor in which the bicarbonate content is less than 4.5% by weight. The mother liquor is then steam stripped to convert a portion of the dissolved sodium bicarbonate in the mother liquor to sodium carbonate to form a carbonate enriched brine. The carbonate enriched brine is then recycled as a portion of said aqueous solvent to be used in the solution mining of the ore deposit.

29 Claims, 3 Drawing Sheets

U.S. PATENT DOCUMENTS

| | | |
|---|---|---|
| 3,050,290 | 8/1962 | Caldwell et al. . |
| 3,072,466 | 1/1963 | Bauer et al. . |
| 3,084,026 | 4/1963 | Frint et al. . |
| 3,097,830 | 7/1963 | Love et al. . |
| 3,111,306 | 11/1963 | Love et al. . |
| 3,113,834 | 12/1963 | Beecher et al. . |
| 3,119,655 | 1/1964 | Frint et al. . |
| 3,184,287 | 5/1965 | Gancy . |
| 3,212,848 | 10/1965 | Tasiaux . |
| 3,246,962 | 4/1966 | Miller . |
| 3,264,057 | 8/1966 | Miller . |
| 3,309,171 | 3/1967 | Gancy . |
| 3,328,130 | 6/1967 | Gancy . |
| 3,368,866 | 2/1968 | Seguela . |
| 3,425,795 | 2/1969 | Howard et al. . |
| 3,451,767 | 6/1969 | Saeman . |
| 3,455,647 | 7/1969 | Gloster . |
| 3,459,497 | 8/1969 | Coglaiti, Jr. et al. . |
| 3,498,744 | 3/1970 | Frint et al. . |
| 3,525,434 | 8/1970 | Garrett et al. . |
| 3,528,766 | 9/1970 | Coglaiti, Jr. et al. . |
| 3,655,331 | 4/1972 | Seglin et al. . |
| 3,656,892 | 4/1972 | Bourne et al. . |
| 3,667,902 | 6/1972 | Blumenthal . |
| 3,695,831 | 10/1972 | Goldstein . |
| 3,717,698 | 2/1973 | Ilardi et al. . |
| 3,725,014 | 4/1973 | Poncha et al. . |
| 3,779,602 | 12/1973 | Beard et al. . |
| 3,792,902 | 2/1974 | Towell et al. . |
| 3,819,805 | 6/1974 | Graves et al. . |
| 3,836,628 | 9/1974 | Ilardi et al. . |
| 3,838,189 | 9/1974 | Sopchak et al. . |
| 3,869,538 | 3/1975 | Sproul et al. . |
| 3,870,780 | 3/1975 | Guptill . |
| 3,904,733 | 9/1975 | Gancy et al. . |
| 3,927,175 | 12/1975 | Garofano et al. . |
| 3,933,977 | 1/1976 | Ilardi et al. . |
| 3,953,073 | 4/1976 | Kube . |
| 3,956,457 | 5/1976 | Port et al. . |
| 3,966,541 | 6/1976 | Sadan . |
| 3,975,499 | 8/1976 | Walden . |
| 3,981,686 | 9/1976 | Lobunez et al. . |
| 3,984,527 | 10/1976 | Gancy et al. . |
| 3,991,160 | 11/1976 | Gancy et al. . |
| 4,019,872 | 4/1977 | Walden . |
| 4,021,525 | 5/1977 | Poncha . |
| 4,021,526 | 5/1977 | Gancy et al. . |
| 4,021,527 | 5/1977 | Baadsgaard . |
| 4,022,867 | 5/1977 | Gancy et al. . |
| 4,022,868 | 5/1977 | Poncha . |
| 4,032,616 | 6/1977 | Artur et al. . |
| 4,039,617 | 8/1977 | Kuo . |
| 4,039,618 | 8/1977 | Gancy et al. . |
| 4,044,097 | 8/1977 | Gancy et al. . |
| 4,083,939 | 4/1978 | Lobunez et al. . |
| 4,104,033 | 8/1978 | Mahn et al. . |
| 4,148,684 | 4/1979 | Farin . |
| 4,151,261 | 4/1979 | Poncha et al. . |
| 4,158,043 | 6/1979 | Gloster . |
| 4,160,812 | 7/1979 | Conroy et al. . |
| 4,169,812 | 10/1979 | Smith et al. . |
| 4,183,901 | 1/1980 | Ilardi et al. . |
| 4,202,667 | 5/1980 | Conroy et al. . |
| 4,232,902 | 11/1980 | Cuevas . |
| 4,252,781 | 2/1981 | Fujita et al. . |
| 4,258,954 | 3/1981 | Stover . |
| 4,260,594 | 4/1981 | Verlaeten et al. . |
| 4,283,372 | 8/1981 | Frint et al. . |
| 4,285,548 | 8/1981 | Erickson . |
| 4,285,915 | 8/1981 | Saldick et al. . |
| 4,286,967 | 9/1981 | Booth, Jr. et al. . |
| 4,288,419 | 9/1981 | Copenhafer et al. . |
| 4,291,002 | 9/1981 | Arnold et al. . |
| 4,299,799 | 11/1981 | Ilardi et al. . |
| 4,344,650 | 8/1982 | Pinsky et al. . |
| 4,374,102 | 2/1983 | Connelly et al. . |
| 4,401,635 | 8/1983 | Frint . |
| 4,472,280 | 9/1984 | Keeney . |
| 4,498,706 | 2/1985 | Ilardi et al. . |
| 4,519,806 | 5/1985 | Copenhafer et al. . |
| 4,557,910 | 12/1985 | Meadow . |
| 4,564,508 | 1/1986 | Fairweather et al. . |
| 4,584,077 | 4/1986 | Chlanda et al. . |
| 4,636,289 | 1/1987 | Mani et al. . |
| 4,652,054 | 3/1987 | Copenhafer et al. . |
| 4,738,836 | 4/1988 | Poncha et al. . |
| 4,743,439 | 5/1988 | Ready . |
| 4,781,899 | 11/1988 | Rauh et al. . |
| 4,814,151 | 3/1989 | Benke . |
| 4,815,790 | 3/1989 | Rosar et al. . |
| 4,869,882 | 9/1989 | Dome et al. . |
| 5,043,149 | 8/1991 | Frint et al. . |
| 5,192,164 | 3/1993 | Frint et al. . |
| 5,238,664 | 8/1993 | Frint et al. . |
| 5,246,273 | 9/1993 | Rosar . |
| 5,262,134 | 11/1993 | Frint et al. . |
| 5,270,023 | 12/1993 | May et al. . |
| 5,283,054 | 2/1994 | Copenhafer et al. . |
| 5,290,322 | 3/1994 | Breton et al. . |
| 5,308,455 | 5/1994 | Bourgeois . |
| 5,362,688 | 11/1994 | Porta et al. . |
| 5,395,497 | 3/1995 | Bourgeois . |
| 5,396,863 | 3/1995 | Ninane et al. . |
| 5,588,713 | 12/1996 | Stevenson . |
| 5,609,838 | 3/1997 | Neuman et al. ............... 423/206.2 |
| 5,618,504 | 4/1997 | Delling et al. ............... 423/206.2 |
| 5,624,647 | 4/1997 | Zolotoochin et al. ......... 423/206.2 |
| 5,690,390 | 11/1997 | Bithell . |

OTHER PUBLICATIONS

Peiper et al., "Thermodynamics of Aqueous Carbonate Solutions Including Mixtures of Sodium Carbonate, Bicarbonate and Chloride", *J. Chem. Thermodynamics,* 14, pp. 618–638, 1982.

Pohorecki et al., "Desorption with chemical reaction in the system $CO_2$–aqueous solution of potassium carbonate", *The Chemical Engineering Journal,* 46, pp. 1–7, 1991.

Rao, D. Phaneswara, "Design of packed towers for absorption and desorption of carbon dioxide using hot promoted $K_2CO_3$ solution", *Gas Separation & Purification,* vol. 5, pp. 177–180, Sep. 1991.

Sarbar et al., "The activity and osmotic coefficients of aqueuous sodium bicarbonate solutions", *Chem. Thermodynamics,* 14, pp. 967–976, 1982.

Savage et al., "Chemical Absorption and Desorption of Carbon Dioxide From Hot Carbonate Solutions", *Chemical Engineering Science,* vol. 35, pp. 1513–1522, 1980.

Taylor, E., "Ihermodynamics of Sodium Carbonate in Solution", *Institute of Paper Chemistry,* pp. 653–657, Jul. 1955.

Vanderzee, Cecil, "Thermodynamic properties of solutions of a hydrolyzing electrolyte: relative partial molar enthalpies and heat capacities, solvent activities, osmotic coefficients, and solute activity coefficients of aqueous sodium carbonate", *J. Chem. Thermodynamics,* 14, pp. 1051–1067, 1982.

Yakovlev et al., "Constant of the Second Stage of Dissociation of Carbonic Acid in Concentrated $Na_2SO_4$ Solutions", *Zh. Prikl. Khim* (Leningrad), vol. 62, No. 6, pp. 1276–1277, 1989.

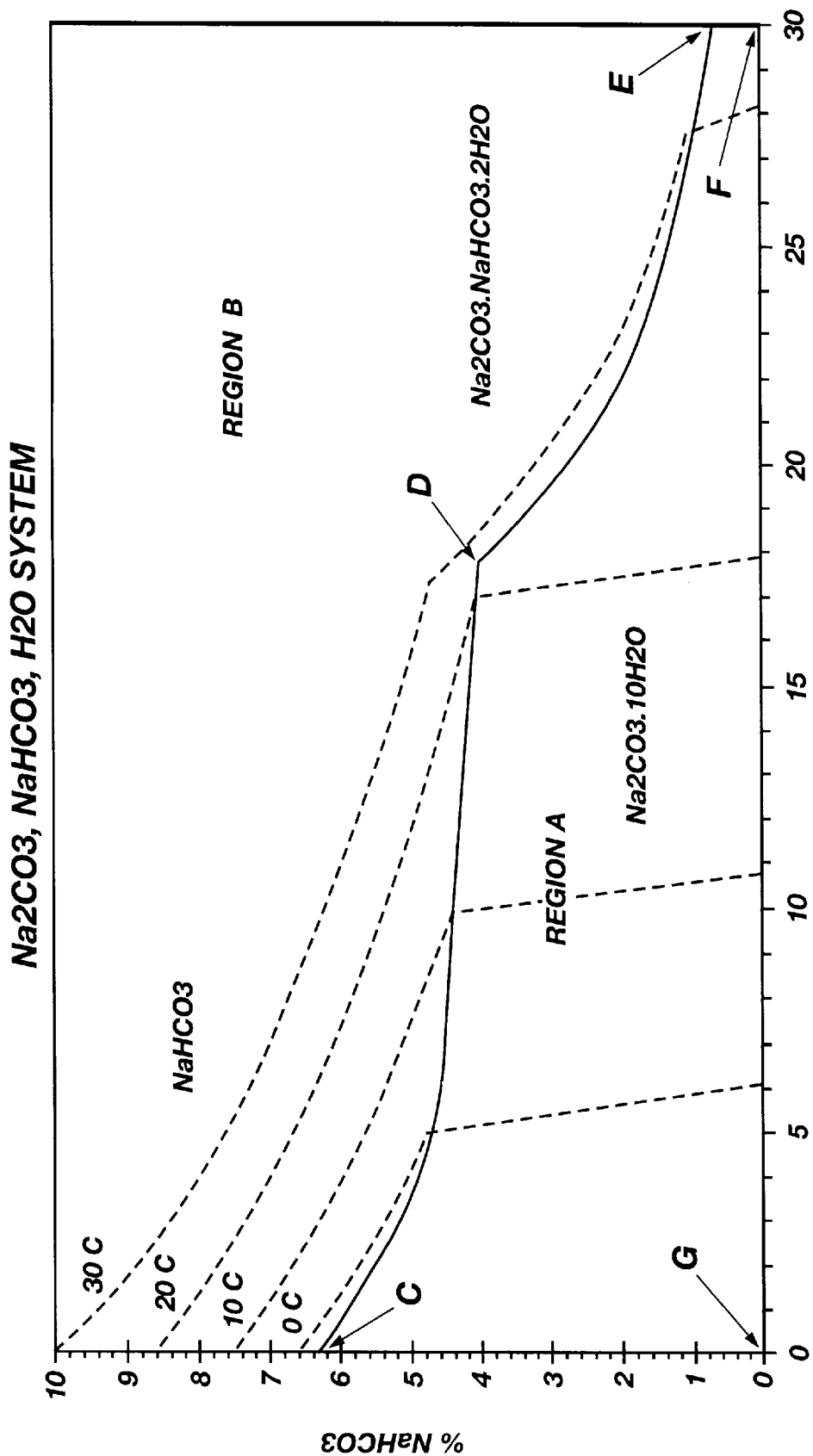

PRODUCTION OF SODIUM CARBONATE FROM SOLUTION MINE BRINE

BACKGROUND OF THE INVENTION

1. Field of the Invention

The present invention relates to a process for recovering sodium carbonate or other sodium based chemicals from solutions containing sodium bicarbonate and especially sodium bicarbonate solutions obtained from solution mining trona deposits.

2. State of the Art

Sodium carbonate (soda ash) is approximately the eleventh highest volume chemical produced in the United States. It is used in the manufacture of glass, chemicals, soaps and detergents, and aluminum. It is also used in textile processing, petroleum refining, and water treatment.

For many years, sodium carbonate was produced by the Solvay process in which carbon dioxide was dissolved in water containing ammonia ($NH_3$) and salt (NaCl) to precipitate sodium bicarbonate which was then separated by filtration and heated to form sodium carbonate. Because of high energy costs and problems associated with disposing of chloride-containing waste streams generated by the Solvay process, it has been abandoned in the United States in favor of obtaining sodium carbonate from naturally occurring trona deposits. Trona deposits are located in Utah, California, and Wyoming. Green River, Wyo. contains the largest known trona deposits in the United States and is actively mined by five companies.

Crude trona ("trona ore") consists primarily (80–95 percent) of sodium sesquicarbonate ($Na_2CO_3 \cdot NaHCO_3 \cdot 2H_2O$) and, in lesser amounts, sodium chloride (NaCl), sodium sulfate ($Na_2SO_4$), organic matter, and insolubles such as clay and shales. In Wyoming, these deposits are located in 25 separate identified beds or zones ranging from 800 to 2800 feet below the earth's surface and are typically extracted by conventional mining techniques such as the room and pillar and longwall methods. The cost of these conventional mining methods is high, representing as much as 35 percent of the production costs for soda ash. Furthermore, recovering trona by these methods becomes more difficult as the best, since most thickly bedded trona deposits are depleted. As a result, recovery of carbonate values from trona has fallen in some cases by as much as 5 to 7 percent. Development of new reserves is expensive, requiring a capital investment of as much as $100 to 150 million in 1995 dollars to sink new mining shafts and to install related equipment.

As its chemical composition indicates, trona ore requires processing in order to recover the sodium carbonate. Most of the sodium carbonate from the Green River deposits is produced from the conventionally mined trona ore via the "monohydrate" process. The "monohydrate" process involves crushing and screening the bulk trona ore which, as noted above, contains both sodium carbonate ($Na_2CO_3$) and sodium bicarbonate ($NaHCO_3$) as well as impurities such as silicates and organic matter. After the trona ore is screened, it is calcined (i.e., heated) at temperatures greater than 150° C. to convert sodium bicarbonate to sodium carbonate. The crude soda ash is dissolved in a recycled liquor which is then clarified and filtered to remove the insoluble solids. The liquor is sometimes carbon treated to remove dissolved organic matter which may cause foaming and color problems in the final product, and is again filtered to remove entrained carbon before going to a monohydrate crystallizer unit, a high temperature evaporator system generally having one or more effects (evaporators), where sodium carbonate monohydrate is crystallized. The resulting slurry is centrifuged, and the separated monohydrate crystals are sent to dryers to produce soda ash. The soluble impurities are recycled with the centrate to the crystallizer where they are further concentrated. To maintain final product quality, it eventually becomes necessary to remove the impurities with a crystallizer purge stream.

The production of sodium carbonate using the combination of conventional mining techniques followed by the monohydrate process is becoming more expensive as the higher quality trona deposits become depleted and labor and energy costs increase. As stated above, recovery of sodium carbonate (usually expressed as tons of sodium carbonate produced per ton of trona ore) has fallen as the higher quality, more readily accessible reserves have been mined. Furthermore, the cost of developing new reserves requires substantial capital investment, as much as $100–150 million in 1995 dollars.

Recognizing the economic and physical limitations of conventional underground mining techniques, various solution mining techniques have been proposed. Solution mining allows the recovery of sodium carbonate from trona deposits without the need for sinking costly mining shafts and employing workers in underground mines. In its simplest form, solution mining comprises injecting water (or an aqueous solution) into a deposit of soluble ore, allowing the solution to dissolve as much ore as possible, pumping the solution to the surface, and recovering the dissolved ore from the solution.

For example, a solution mining technique was proposed in U.S. Pat. No. 2,388,009 to Pike on Oct. 30, 1945. Pike discloses a method of producing soda ash from underground trona deposits in Wyoming by injecting a heated brine containing substantially more carbonate than bicarbonate which is unsaturated with respect to the trona, withdrawing the solution from the formation, removing organic matter from the solution with an adsorbent, separating the solution from the adsorbent, crystallizing and recovering sodium sesquicarbonate from the solution, calcining the sesquicarbonate to produce soda ash, and re-injecting the mother liquor from the crystallizing step into the formation.

A second patent to Pike, U.S. Pat. No. 2,625,384, discloses another solution mining method which uses water as a solvent under ambient temperatures to extract trona from existing mined sections of the trona deposits. The subsequent solution is recovered from the mine and heated before dissolving additional dry mined trona in it to form a carbonate liquor having more concentrated values of sodium salts which can subsequently be processed into sodium carbonate.

An additional complicating factor in dissolving trona deposits underground is that sodium carbonate and sodium bicarbonate have different solubilities and dissolving rates in water. These incongruent solubilities of sodium carbonate and sodium bicarbonate can cause bicarbonate "blinding" when employing solution mining techniques. Blinding can slow dissolution and may result in leaving behind significant amounts of reserves in the mine. Blinding occurs as the bicarbonate, which has dissolved in the mining solution tends to redeposit out of the solution onto the exposed surface of the ore as the carbonate saturation in the solution increases, thus "blinding" this surface—and its carbonate values—from further dissolution and recovery. Therefore it is anticipated that long term solution mining of a particular deposit may produce brines with lower sodium carbonate values and higher sodium bicarbonate values than those seen initially. This requires that a process be capable of handling the changing brine grade or that incongruent dissolution must be avoided by some means. "Blinding" is an occurrence which has long been recognized as a problem pertaining to solution mining and is described, for example, in numerous U.S. patents.

U.S. Pat. No. 3,184,287 to Gancy discloses a method for preventing incongruent dissolution and bicarbonate blinding in the mine by using an aqueous solution of an alkali, such as sodium hydroxide having a pH greater than sodium carbonate, as a solvent for solution mining. U.S. Pat. No. 3,953,073 to Kube and U.S. Pat. No. 4,401,635 to Frint also disclose solution mining methods using a solvent containing sodium hydroxide. Unfortunately, alkalis such as sodium hydroxide or lime are expensive and adversely affect the economics of these processes.

The concept of avoiding incongruent dissolution using a brine containing sodium carbonate was discussed by Gancy, supra, and also in U.S. Pat. No. 5,043,149 to Frint, which discloses a specific method to accomplish this. The proposed process disposes of insoluble tailings that remain after uncalcined or calcined trona is dissolved during the process of producing soda ash. The tailings are slurried with water or waste solutions of sodium carbonate or sodium bicarbonate or both and injected into an underground, mined-out cavity. A liquor is removed from the cavity whose concentration of sodium carbonate or sodium bicarbonate or both has been increased and from which sodium-based chemicals may be recovered. Even using these techniques, however, sodium carbonate values can be expected to fall with time and bicarbonate values are likely to be elevated in the brine extracted from the mine.

It is apparent, therefore, that a significant, continuing problem associated with solution mining is the subsequent recovery of the sodium carbonate from the relatively low concentration of carbonate and bicarbonate in the solution mine brine. In recent patents issued to Frint, U.S. Pat. No. 5,262,134, and Copenhafer, U.S. Pat. No. 5,283,054, it is pointed out that past patents such as Kube, U.S. Pat. No. 3,953,073, lack an explanation of how to convert economically these semi-dilute sodium bicarbonate/carbonate mixtures into soda ash. In addition, the solution mining techniques disclosed above produce brines containing sufficient sodium bicarbonate and other impurities to prevent processing into sodium carbonate by the conventional monohydrate process. A major problem experienced is the co-precipitation of sodium sesquicarbonate crystals during sodium carbonate monohydrate crystallization which reduces the quality of the final product.

Several attempts to solve these problems have been made over the years. For example, Miller in U.S. Pat. No. 3,264,057 (1966), describes a process for solution mining of trona. The process directs an aqueous solution to an underground cavity to dissolve trona. The brine removed from underground is split, one part of it going to a steam stripper which converts some bicarbonate to carbonate. The carbonate rich brine from the stripper is recycled to the mine. The other part of the brine stream is directed to an evaporator system (three stages) wherein the brine is concentrated and carbonate crystals are formed by evaporation of water. The final evaporator is operated at 145° C.

Water and some $CO_2$ are driven off in each evaporation stage, but especially in the final stage. Operation of the final evaporator at 145° C., with the concentration of $Na_2CO_3$ increasing and the concentration of $NaHCO_3$ decreasing, results in anhydrous crystals of $Na_2CO_3$ being formed, according to the patent. These crystals are separated by a centrifuge and the wet crystals dried to produce soda ash.

This process requires that enormous quantities of water be circulated through the stripper and mine to keep the alkalinity of the solution mining brine at high levels. The low alkalinity values which would otherwise result would be economically devastating to a process such as Miller's which relies upon evaporation to concentrate the carbonate values and cause crystallization. Also, because many trona deposits are fairly deep, this recirculating load represents an additional economic penalty. This process suffers from other problems, as well, such as the difficulty of producing appropriately sized anhydrous soda ash directly. In addition, the crystallization, centrifugation, and drying steps must all be performed under pressure and at elevated temperatures to avoid the conversion of the anhydrous salt to monohydrate and the extreme processing problems which result from this.

Frint et al., in U.S. Pat. No. 5,262,134, disclose a process for producing soda ash from a solution mine brine containing sodium carbonate and sodium bicarbonate by heating the brine to between 90° C. and 115° C. to evaporate water, convert sodium bicarbonate to sodium carbonate, and to drive off the resulting carbon dioxide therefrom until the concentration of sodium carbonate and sodium bicarbonate in the brine form a solution that will crystallize sodium sesquicarbonate. The sesquicarbonate is then crystallized and separated, and the mother liquor, which is now depleted in bicarbonate, is subjected to a sodium carbonate decahydrate crystallization step. The sesquicarbonate and decahydrate crystals are then processed into various sodium based chemicals including sodium carbonate. This process suffers from the disadvantage of requiring two crystallization steps producing a different crystal species in each step. In addition, it requires the evaporation of large quantities of water early in the process before liquors suitable for feed to more traditional processes can be produced. A small decline in brine grades would adversely affect the economics of such a process because of the tremendous amount of water which would have to be evaporated to produce brines suitable for the later crystallization steps. In addition, the process involves the production of sodium sesquicarbonate, which subsequently yields a significantly less dense soda ash with less widespread acceptance in the market. Therefore, this process further exemplifies the challenges in handling dilute brines from solution mining processes.

Another process, similar to Frint's, which attempts to deal with processing complex bicarbonate and carbonate containing brines was described by Cunningham in U.S. Pat. No. 2,049,249, although in contrast to Frint, it does not deal with brines produced by solution mining. Bulk trona is dissolved to produce a brine which is processed above 17° C. to precipitate sodium bicarbonate. The solid sodium bicarbonate is separated from the mother liquor, which is diluted before it is directed to a cooling crystallizer operated below 17° C. to crystallize sodium carbonate decahydrate. As with the Frint process, U.S. Pat. No. 5,262,134, this process suffers from the disadvantage of requiring two crystallization steps, each producing a different crystal species. The dilution of the mother liquor before decahydrate crystallization is required to avoid forming additional, contaminating, sodium bicarbonate in the decahydrate crystals, but represents an economic penalty. Although this process does not have to deal with incongruent dissolution, blinding and other problems associated with solution mining, it nevertheless produces two products, which means the process can produce only to the level of demand for the less widely used product, sodium bicarbonate.

Copenhafer et al., U.S. Pat. No. 5,283,054, discloses a method for producing soda ash from a brine produced by solution mining. Sodium carbonate and sodium bicarbonate are contained in the dilute brine, which is heated from about 100° C. to about 140° C. to evaporate water, to convert sodium bicarbonate to sodium carbonate, and to drive off resulting carbon dioxide. Such concentrated brine having reduced sodium bicarbonate content is then reacted with a sufficient amount of aqueous sodium hydroxide solution to convert essentially all of the remaining sodium bicarbonate in the brine to sodium carbonate. The resulting concentrated sodium carbonate solution having virtually no bicarbonate is further processed to recover soda ash. This solution mining process has been commercially developed and represents the most recent approach to the problems of solution mining of underground trona deposits. Nonetheless, this process still suffers from several drawbacks, including the large requirements of energy to evaporate water to produce concentrated brines. Because the brines are concentrated, caustic is added to take the bicarbonate levels to near zero to avoid sesquicarbonate precipitation in the decahydrate crystallizer. Sodium sesquicarbonate precipitation results in unacceptably high bicarbonate contamination of the decahydrate product, as well as creating severe operating problems related to the poor crystal habit which inevitably results. The high cost of the sodium hydroxide required in the process (even when the caustic is produced on site from carbonate liquors and lime) represents a significant economic penalty. In addition, the operation of a mechanical vapor recompression system for evaporating large quantities of water early in the process adds a significant cost. The process requires a large capital investment for causticizing equipment, evaporators and an MVR.

Solution mining processes generally require either the recirculation of large quantities of pregnant brine or the evaporation of large quantities of water to produce brines with elevated alkalinity values. Many require the production of two products simultaneously and therefore subject the operator to the significant marketing problems associated with this situation. Still other processes, particularly those being commercially developed, require the use of substantial quantities of expensive neutralizing agents such as caustic soda or lime. Unfortunately, these expensive steps tend to offset the costs saved through solution mining. A process which eliminates or reduces the need for these expensive steps, and which produces one product suitable as a feed stock to existing processes producing a variety of products, would finally allow the realization of the advantages expected with solution mining.

Various differences exist between solution mining processes as applied to underground deposits of sodium bicarbonate containing ores, e.g., trona, and above-ground processes which treat bulk ore which has been conventionally mined. Bulk trona (sodium sesquicarbonate), for example, may be dissolved in an aqueous solvent at high temperatures which are difficult to achieve underground. This allows a much higher concentration to be achieved. After purification, these liquors may be cooled to recrystallize the sesquicarbonate, which is then calcined and converted to soda ash. Alternatively, the bicarbonate content of the mined ore may be decomposed thermally in a calciner, a process which cannot be performed on ore in situ. The calcined ore can then be dissolved in hot liquors to produce an essentially saturated sodium carbonate liquor. In either case, calcination of dry material is required to convert bicarbonate values to carbonate. Therefore, the production of sodium carbonate and other valuable sodium salts by solution mining has generally been more complicated than the production of these same products from conventionally mined ores.

For example, some solution mining processes have included the addition of conventionally mined ore to the mine brine to increase the sodium content of the brine and, therefore, make the brine processable by techniques applied to conventionally mined ore.

A further complicating factor has been the need to eliminate the relatively higher level of soluble impurities associated with solution mine brines. Recently, this has led to the consideration of producing sodium carbonate decahydrate as an intermediate step in the production of sodium salts, including soda ash. Sodium carbonate decahydrate crystals contain ten waters of hydration, which water, unlike entrained or occluded water, is uncontaminated by other sodium salts or other contaminants. Thus, most recently devised processes have focused on the production of sodium carbonate decahydrate. Generally, crystallization is best carried out using concentrated feed streams. This has led to the development of processes (Copenhafer and Frint, for example) involving evaporation to concentrate the brines before they are cooled to produce sodium carbonate decahydrate. In turn, this has created the need to eliminate nearly all of the bicarbonate. Steam stripping has been employed to reduce bicarbonate levels, but cannot economically lower the concentration of bicarbonate in these concentrated brines to a level adequate to avoid bicarbonate related processing problems in the decahydrate crystallizer. The final reduction in bicarbonate levels has been achieved by crystallization of sesquicarbonate in the case of Frint, or by the addition of caustic in the case of Copenhafer. Therefore, solution mining processes proposed in the prior art are complex and expensive. The present invention, in contrast, provides a simplified and less expensive process for handling solution mining brines.

SUMMARY

The instant invention relates to a unique process for recovering sodium compounds from dilute brines produced by the solution mining of a sodium bicarbonate containing ore deposit. The bicarbonate values, and such carbonate values as may be present in the ore deposit are dissolved by an aqueous solvent having a significant carbonate content. The aqueous solvent used for solution mining preferably consists, at least partially, of brine recycled from the solution processing operation.

The dilute brine stream from the mining process is generally initially subjected to a bicarbonate reduction step. This dilute brine is then fed to a sodium carbonate decahydrate crystallizer. The bicarbonate reduction step is employed to ensure that bicarbonate levels in the crystallizer remain low enough to avoid precipitation of bicarbonate containing compounds. Although it generally would be uneconomical to do so, it is understood that the solution mining process could be operated in such a manner that the dilute brine stream coming from the mine has sufficiently low enough bicarbonate levels such that precipitation of bicarbonate containing compounds does not occur in the sodium carbonate decahydrate crystallizer. If the solution mining process is operated in this manner, the bicarbonate reduction step can be eliminated without deviating from the scope of the present invention.

A number of known techniques may be used for the bicarbonate reduction step. For example, caustic soda or other alkaline compounds can be added to neutralize some of the bicarbonate value. More preferably, the stream can be diluted, either with a fresh water stream, or with a stream containing low bicarbonate values such as the recycle stream from the process. Alternately, the bicarbonate reduction step can be accomplished using steam stripping, which converts the bicarbonate to carbonate and carbon dioxide, the carbon dioxide being removed with the exit steam.

The stream containing a low or reduced bicarbonate level is then fed to a cooling crystallizer, where sodium carbonate decahydrate is crystallized. The sodium carbonate decahydrate crystals are separated from the mother liquor using a centrifuge or other solid-liquid separator. The sodium carbonate decahydrate crystals can then be processed into other sodium containing chemicals such as soda ash, sodium bicarbonate, or caustic soda.

The mother liquor, from the decahydrate crystallization step, is steam stripped to decompose a substantial portion of the bicarbonate within the mother liquor. The reduced bicarbonate brine so produced is then recycled to the mine as the solvent for additional solution mining. Alternatively, a portion of this brine may be used as the dilution brine for the initial bicarbonate reduction step. Makeup water can also be added to the reduced bicarbonate brine being recycled to the mine as needed to maintain a water balance.

BRIEF DESCRIPTION OF THE DRAWINGS

FIG. 3 is a phase diagram for the sodium carbonate, sodium bicarbonate, and water system. Solubility limits for various species at several temperatures are indicated by the dashed lines. The area below the solid line extending from C to D to E to F to G and back to C, defined as region A, describes the solution compositions for which sodium bicarbonate containing salts (sodium sesquicarbonate, sodium bicarbonate) are not in equilibrium with the solutions at any temperature. In other words, these bicarbonate containing salts will not precipitate from solutions with compositions within region A. In region B (the area above the solid line extending from C to D to E), bicarbonate containing salts (sodium bicarbonate, sodium sesquicarbonate, and the like) are in equilibrium with solutions at some temperatures. In other words, these salts may precipitate from solutions in region B at some temperatures.

DETAILED DESCRIPTION OF THE ILLUSTRATED EMBODIMENT

Figure 1:
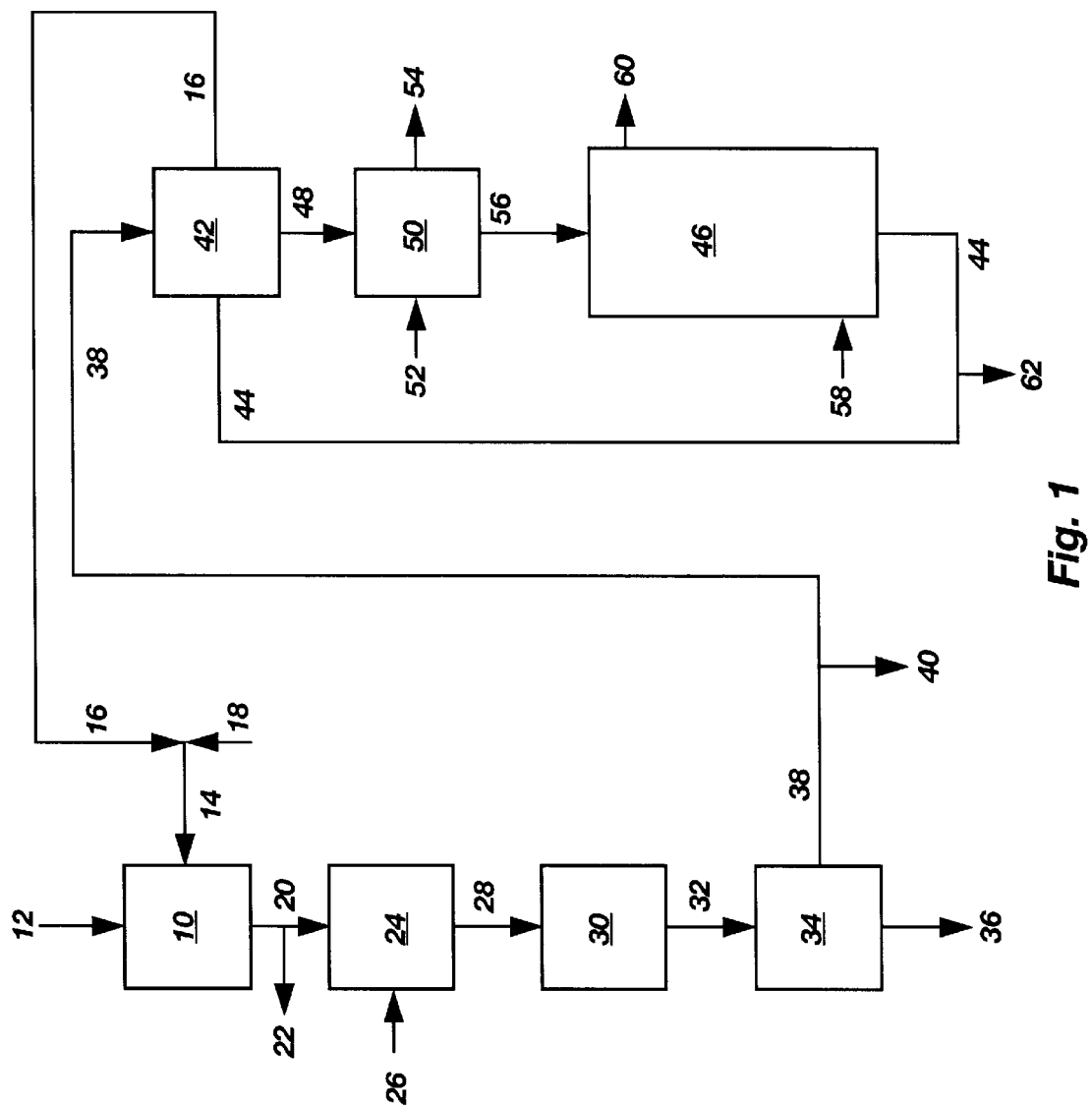
FIG. 1 is a schematic flow sheet illustrating one embodiment of the process of the instant invention.

The instant invention is particularly directed to producing various sodium compounds from dilute brines obtained by the solution mining of ore deposits containing substantial quantities of sodium bicarbonate, including ores additionally containing sodium carbonate. A preferred ore is trona, which consists primarily of sodium sesquicarbonate ($Na_2CO_3 \cdot NaHCO_3 \cdot 2H_2O$).

A general overview of the process of the present invention as applied to a trona deposit is as follows:
1) A sodium bicarbonate containing ore deposit is solution mined with an aqueous solution (solvent) containing sodium carbonate to produce a dilute brine containing sodium bicarbonate and sodium carbonate. The dilute brine from the mine typically contains between about 7% and 18% sodium carbonate by weight and between about 3% and 12% sodium bicarbonate by weight.
2) The dilute brine is treated to reduce the sodium bicarbonate level. In cases where the solution mining brine is significantly undersaturated with respect to sodium bicarbonate, it may be possible to eliminate this step, although generally this would imply an inefficient solution mining operation.
3) The brine containing a reduced sodium bicarbonate content is cooled to less than about 20° C. to precipitate sodium carbonate decahydrate crystals and to produce a mother liquor which contains significant sodium bicarbonate and sodium carbonate values. The crystallization step is conducted so that the sodium bicarbonate concentration in the mother liquor is preferably below about 4.5% by weight.
4) The sodium carbonate decahydrate crystals are separated from the mother liquor which typically contains between about 4% and 18% sodium carbonate by weight and up to about 4.5% sodium bicarbonate by weight.
5) The mother liquor is stripped with steam to convert a substantial portion of the sodium bicarbonate to sodium carbonate to yield a sodium carbonate enriched brine.
6) All or part of the sodium carbonate enriched brine, as is, or in conjunction with make-up water, is recycled to the bicarbonate containing ore deposit.

The sodium carbonate decahydrate crystals may be converted to soda ash or to other sodium containing compounds by conventional techniques. If soda ash is produced, the sodium carbonate decahydrate crystals may be melted and then processed via a conventional monohydrate process. Steam from crystallizers in the monohydrate process may be advantageously used in the process described in this invention.

One unique aspect of this invention is that it precipitates sodium carbonate decahydrate from relatively dilute solutions containing significant quantities of sodium bicarbonate. This allows the use of steam stripping as the only required source of sodium bicarbonate decomposition, eliminating the need for expensive neutralizing agents such as caustic.

Another unique aspect of the present invention is the placement of the steam stripper after the sodium carbonate decahydrate crystallizer. This novel placement allows for a more efficient stripping operation, and increases the amount of sodium bicarbonate which can be decomposed by stripping. This ultimately serves to minimize the negative consequences of incongruent dissolution, and will lead to a larger portion of the ore reserve in the mine being economically recovered.

The present invention will be described more fully with reference to FIGS. 1–3 in which a preferred process of the present invention is shown or explained. This invention can, however, be practiced in combination with various processes and ore bodies and should not be construed as limited to the process set forth herein. Rather, this process is provided so that this disclosure will be thorough and complete, and will fully convey the scope of the invention to those skilled in the art.

FIG. 1 is a simplified schematic of an embodiment of the present invention for producing sodium carbonate decahydrate crystals which would then be further processed to form soda ash or other sodium containing salts. An underground deposit of trona is solution mined by the formation of a solution mine 10 (usually conventionally mined, or fractured or porous ore deposits) into which natural water 12 may flow from underground streams, etc. and into which a mining liquor stream 14 is directed. The mining liquor stream 14 may comprise a combination of a recycle liquor stream 16 and a make-up water stream 18. The recycle liquor stream 16 typically may contain some quantity of sodium carbonate, usually between about 4% and 18% by weight, sodium bicarbonate, usually between about 0% and 4% by weight, and small quantities of sodium chloride and sodium sulfate. The make-up water stream 18 may contain some sodium carbonate, some sodium bicarbonate and minor quantities of sodium chloride and sodium sulfate. Alternatively, the make-up water stream 18 may be substantially pure water containing no salts.

As the mining liquor stream 14 and natural water 12 contact the trona deposit, the mining liquor stream 14/natural water 12 solution is enriched in sodium carbonate and sodium bicarbonate by dissolution of the trona. Other soluble impurities such as chlorides, sulfates, silicates, and organic materials may also be dissolved.

The dissolution process of the trona is complicated by the incongruent solubilities of sodium carbonate and sodium bicarbonate in water. Since the solubility of carbonate is significantly greater than the solubility of the bicarbonate, the surface of the trona deposit in the mine may gradually become coated with a layer of bicarbonate. This phenomenon has also been described as a redeposition of sodium bicarbonate upon the trona surface, and is frequently referred to as "bicarbonate blinding." This layer of bicarbonate tends to slow the dissolution process with respect to carbonate, which may become masked by the bicarbonate layer. Therefore, over time, a trona formation mined with water may experience a decline in the carbonate content of the dilute brine stream 20 (the bicarbonate content may actually increase as this occurs).

Phase diagrams suggest that eventually the sodium carbonate and sodium bicarbonate content ("brine grades") in the dilute brine stream 20 recovered from the mine 10 operated at 20° C. could fall to as low as 7.5% sodium carbonate by weight and rise up to 5.9% sodium bicarbonate by weight if the formation is mined with only water. By returning some carbonate value to the mine, the decline in brine grades can be arrested. For example, the use of a mining liquor stream 14 containing 12% sodium carbonate by weight and no sodium bicarbonate could produce a fully saturated dilute brine stream 20 containing about 17% sodium carbonate by weight and about 4.0% sodium bicarbonate by weight. However, this leads to a maximum recoverable total alkalinity (TA) value of 7.52 tons per 100 tons of mining liquor 14, while the case of utilizing pure water as the solvent yields a maximum recoverable TA of 11.2 tons per 100 tons of solution mining liquor (TA is the total alkalinity content of a brine, both carbonate and bicarbonate, expressed as sodium carbonate value). Surprisingly, this suggests that in a solution mining process being operated in a manner consistent with a long-term, stable operation, the recoverable alkallinty per gallon of dilute brine stream 20 can be greater for dilute brines than for more concentrated brines. The instant invention is a unique process in that it can economically use very dilute brines and offer the possibility of long-term, stable mining operations.

The solution mining is generally conducted at temperatures from between about 35° F. (1.7° C.) and 200° F. (93.3° C.) with a temperature range of between about 60° F. (15.6° C.) and 150° F. (65.6° C.) being typical. The dilute brine stream 20 pumped from the mine 10 will generally have a temperature of between about 65° F. (18.3° C.) and 200° F. (93.3° C.) with a sodium carbonate composition typically of from between about 7% and 18% by weight, sodium bicarbonate from between about 3% and 12% by weight, sodium chloride from between about 0% and 10% by weight, and sodium sulfate from between about 0% and 10% by weight.

A portion of the dilute brine stream 20 pumped from the mine 10 may be purged through a dilute brine purge stream 22 and be used for other purposes. The purging through a dilute brine purge stream 22 removes soluble impurities such as chlorides, sulfates, silicates, and organic compounds. Although the dilute brine stream 20 does not represent the point at which the ratio of impurities to alkalinity is the highest, it is an attractive purge location if the dilute brine purge stream 22 can be used or sold for other purposes such as $SO_2$ scrubbing from power station exhaust gases or as a feed for a lime soda caustic plant, where the lower alkalinity of a later purge stream would impose economic penalties.

Furthermore, it is understood that the dilute brine stream 20 may be treated to facilitate downstream processing. Such treatment could include preheating, filtration to remove insoluble material, carbon treating to remove organic contaminants, or the addition of treatment chemicals such as antiscalants or antifoams.

Generally, the dilute brine stream 20 removed from the mine 10 will be at or near saturation with respect to bicarbonate. If the dilute brine stream 20 is immediately crystallized to form the desired product of sodium carbonate decahydrate, some precipitation of sodium bicarbonate containing compounds could be expected along with the crystallization of sodium carbonate decahydrate. Since the presence of sodium bicarbonate containing compounds in the sodium carbonate decahydrate product is undesirable, some pretreatment of the dilute brine stream 20 is generally required before crystallization of the sodium carbonate decahydrate.

To pretreat the dilute brine stream 20, the dilute brine stream 20 is fed to a bicarbonate reducer 24. The bicarbonate reducer 24 may simply comprise a reducer stream 26 being introduced to the dilute brine stream 20 to form a reduced brine stream 28. The reducer stream 26 may be a caustic soda solution, other solutions of alkaline compounds, or the like which is added to neutralize some of the bicarbonate value in the dilute brine stream 20. However, the cost of the caustic soda solution or other alkaline compounds may be economically prohibitive. Alternately, the reducer stream 26 can be a dilution stream such as a fresh water stream, or a stream containing low bicarbonate values such as a portion of the recycle liquor stream 16 from the process. The dilution will serve to lower the bicarbonate concentration in the reduced brine stream 28 (although no net destruction of bicarbonate has occurred). The amount of dilution required will be dictated by the concentration levels needed to ensure that bicarbonate containing compounds are not precipitated in a subsequent crystallization step, discussed below. The amount of dilution required can be determined without undue experimentation by one skilled in the art knowing the operating parameters of the subsequent crystallization step.

Figure 2:
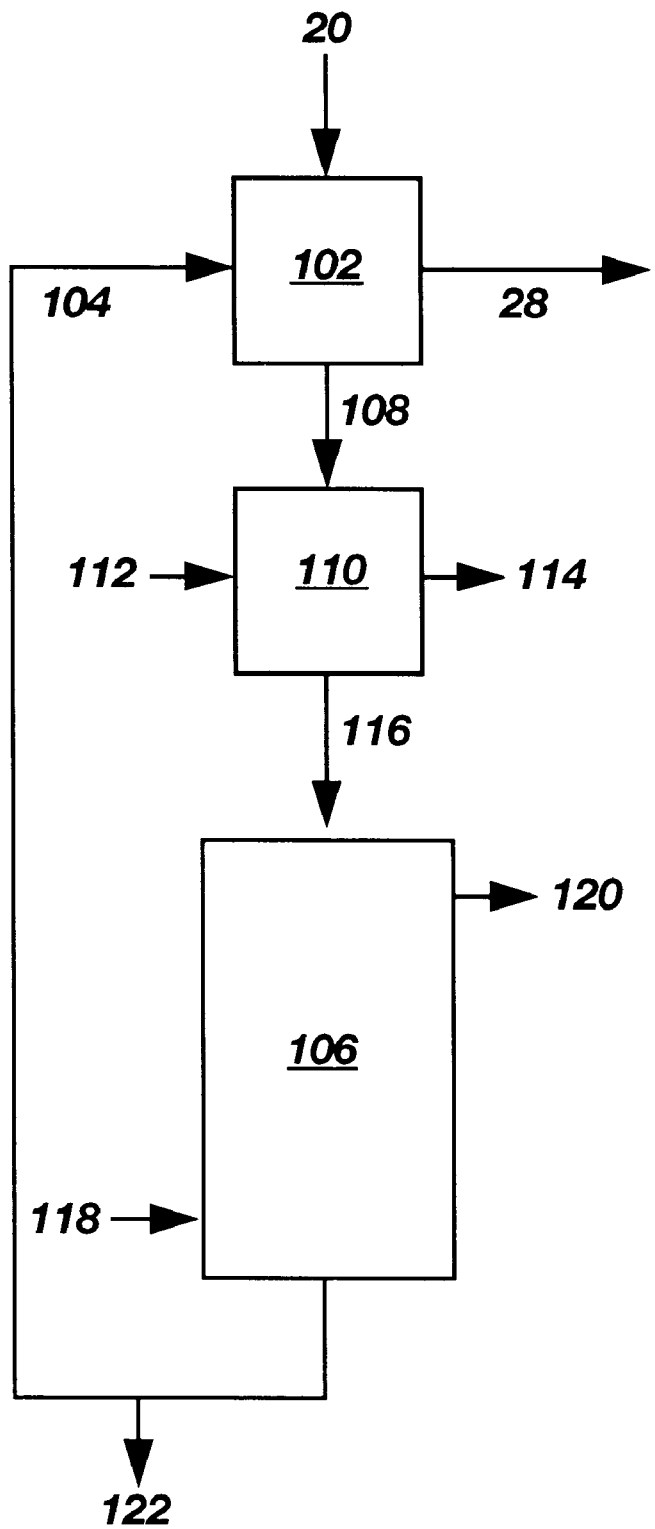
FIG. 2 is a schematic flow sheet illustrating a stripping system used as a sodium bicarbonate reducer in the instant invention.

Alternately, the bicarbonate reducer 24 can be a steam stripping system which converts the sodium bicarbonate to sodium carbonate and carbon dioxide, wherein the carbon dioxide is removed with the exit steam, as shown in FIG. 2. In this steam stripping system, the dilute brine stream 20 is directed to a heat exchanger 102 where the temperature of the dilute brine stream 20 may be increased by heat exchange with a stripped brine stream 104 from the stripping column 106 to a temperature near that of the operating temperature of the stripping column 106. The heated diluted brine stream 108 (which has the same chemical composition as dilute brine stream 20) is then directed into a trim heat exchanger 110. The temperature of the heated dilute brine stream 108 is increased in the trim heat exchanger 110 by heat exchange with a steam stream 112. The steam stream 112 exits the trim heat exchanger 110 as a condensate steam stream 114. The heated dilute brine stream 108 exits as hot dilute brine stream 116. The trim heat exchanger 110 is used to increase the temperature of the heated dilute brine stream 108 (resulting in a hot brine stream 116) to a temperature approximately equal to that of the operating temperature of the stripping column 106, so that flashing and condensation may be avoided in the stripping column 106.

The hot dilute brine stream 116 is fed to the top of a stripping column 106 which has a stripping steam stream 118 directed into the bottom of the column. The stripping column 106 is usually operated at between about 150° F. (65.6° C.) and 350° F. (176.7° C.). The stripping column 106 converts sodium bicarbonate in the hot dilute brine stream 116 to sodium carbonate by stripping off the carbon dioxide generated by the following reaction:

$$2NaHCO_3 \rightarrow Na_2CO_3 + H_2O + CO_2\uparrow$$

Steam and carbon dioxide exit through exhaust line stream 120. The exhaust line stream 120 is preferably used for heating elsewhere in the mining plant (for example, in a monohydrate crystallizer). The operating temperature for the stripping column 106 is preferably between about 210° F. (98.9° C.) and 270° F. (132.2° C.). The stripping column 106 is operated such that the chemical composition of the stripped brine stream 104 exiting the bottom of the stripping column 106 is usually as follows:

sodium carbonate: up to about 24% by weight, preferably between about 9% and 18% by weight;

sodium bicarbonate: from between about 1% and 4.5% by weight, preferably between about 3% and 4% by weight;

sodium chloride: up to about 10% by weight; and sodium sulfate: up to about 10% by weight.

A portion of the stripped brine stream 104 may be purged in stripped brine purge stream 122 and diverted for other uses, such as the feed to a lime soda caustic plant. The stripped brine stream 104 is directed through heat exchanger 102 to heat up the dilute brine stream 20 being pumped from the mine 10, as discussed above. After being directed through the heat exchanger, the stripped brine stream 104 becomes significantly cooler, usually slightly above the temperature of the dilute brine stream 20, to form reduced brine stream 28.

It is understood that the reduction of the dilute brine stream 20 could be eliminated in the circumstance where the bicarbonate content of the dilute brine stream 20 is low enough that direct crystallization of the desired sodium carbonate decahydrate product will not result in the precipitation of bicarbonate containing compounds.

Referring to FIG. 1, the reduced brine stream 28, whether formed by caustic addition, alkaline addition, fresh water dilution, recycle dilution, or by steam stripping, is fed to a sodium carbonate decahydrate crystallizer 30 where sodium carbonate decahydrate is precipitated from the reduced brine stream 28. The sodium carbonate decahydrate crystallizer 30 is generally operated at a temperature below about 68° F. (20° C.). Water may be evaporated in the sodium carbonate decahydrate crystallizer 30 to cool the reduced brine stream 28, although other forms of cooling or refrigeration are acceptable. Evaporative cooling is generally accomplished by boiling water under vacuum using barometric condensers or steam jet refrigeration, well known techniques to those skilled in the art.

In order to form substantially pure sodium carbonate crystals in the sodium carbonate decahydrate crystallizer 30, the reduced brine stream 28 carbonate and bicarbonate concentrations must be such that the reduced brine stream 28 is not in equilibrium with either sodium sesquicarbonate or sodium bicarbonate at any temperature between that of the reduced brine stream 28 and the temperature of the sodium carbonate dehydrate crystallizer 30. Referring to the phase diagram illustrated in FIG. 3, for a pure sodium carbonate, sodium bicarbonate, and water system, the range of concentrations which meet this criteria is given by region A (bound by the solid line formed by connecting points C, D, E, F, and G). Compositions outside this range (region B) may first precipitate either sodium sesquicarbonate or sodium bicarbonate (usually in a needle-type shape) when introduced to the sodium carbonate decahydrate crystallizer 30. When these solutions subsequently form sodium carbonate decahydrate crystals, the crystals appear to grow on or around the sesquicarbonate or bicarbonate crystals in a manner that the majority of the sodium carbonate decahydrate crystals are of an undesirable shape, e.g., needle shape, resulting in poor centrifuge operation and are, of course, internally contaminated with bicarbonate or sesquicarbonate material. For systems which contain additional impurities, an appropriate phase diagram similar to that constructed in FIG. 3 must be used. Those skilled in the art are familiar with the construction of such phase diagrams.

Therefore, the bicarbonate reduction step performed in bicarbonate reducer 24 must be performed in a manner to produce a reduced brine stream 28 within region A of the phase diagram of FIG. 3 (or appropriate phase diagram). For economic reasons, it is preferred that the bicarbonate reduction proceeds no further than required at this stage, so that generally the reduced brine stream 28 will contain bicarbonate levels near the upper end of region A, often at levels of 3% or greater by weight.

As it can be seen in FIG. 3, for sodium carbonate concentrations above about 18% by weight, the maximum bicarbonate solubility concentration decreases rapidly with increasing carbonate values. Therefore, very low bicarbonate values are required in the reduced brine stream 28. For example, Copenhafer et al. (U.S. Pat. No. 5,283,054) utilizes crystallizer feed streams having a high concentration of carbonate and essentially no bicarbonate.

The reduced brine stream 28 is preferably dilute, generally being less than 24% sodium carbonate by weight, preferably less than 20%, and even more preferably less than 18%. The reduced brine stream 28 may contain significant quantities of bicarbonate and yet still be within region A of FIG. 3. However, to be able to produce sodium carbonate decahydrate crystals which are substantially free of bicarbonate contamination, the bicarbonate content of the reduced brine stream 28 must be low enough that the mother liquor (the solution remaining after crystallization of the sodium carbonate decahydrate crystals) in the sodium carbonate decahydrate crystallizer 30 will also be within region A of FIG. 3. This condition can be easily tested by simple heat and material balance calculations familiar to those skilled in the art. It may be seen by reference to the phase diagram illustrated in FIG. 3 that the sodium carbonate decahydrate crystals may be precipitated from dilute sodium carbonate solutions containing as much as about 4.5% sodium bicarbonate by weight without precipitating the sodium bicarbonate or sesquicarbonate. However, since ten waters of hydration are removed from such dilute solutions for each sodium carbonate molecule precipitated as sodium carbonate decahydrate, the solution becomes more concentrated with respect to sodium bicarbonate as sodium carbonate decahydrate is precipitated. Furthermore, when evaporative cooling is used in the cooling of the sodium carbonate decahydrate crystallizer 30, evaporation of water to produce cooling is occurring in the sodium carbonate decahydrate crystallizer 30 which further concentrates the solution with respect to both sodium carbonate and sodium bicarbonate. Therefore, heat and material balances must be performed to ensure the mother liquor in the sodium carbonate decahydrate crystallizer 30 is within region A of FIG. 3. Generally, only a reduced brine stream 28 which is very close to the upper border of region A will fail the heat and material balance test. Thus, in contrast to the prior art, by using a reduced brine stream 28 formed as discussed above, substantial quantities of bicarbonate can exist in the reduced brine stream 28 while still effectively precipitating substantially pure sodium carbonate decahydrate crystals. Therefore, the reduced brine stream 28 can be prepared without the need to eliminate substantially all of the bicarbonate prior to crystallization, as required by the prior art.

It has been found that, in the above process, the sodium carbonate decahydrate crystallizer works quite effectively with dilute solutions in the presence of significant quantities of bicarbonate, for example, from between about 2% and 4% by weight and even up to 4.5% by weight in the extreme case. Carbonate concentrations in the reduced brine stream 28 are generally less than about 18%, although they may be as high as 24%. Higher carbonate concentrations are generally not preferred because of the difficulty in reducing the sodium bicarbonate to sufficiently low values in the bicarbonate reduction step. The sodium carbonate decahydrate crystallizer works well with carbonate concentrations in the reduced brine stream 28 of about 17% to 18% or even lower.

Although it is generally contrary to conventional crystallizing techniques, it is actually preferred in the instant process to use dilute solutions of sodium carbonate rather than concentrated solutions. While extra volumes of water may need to be handled, the avoidance of evaporating large quantities of water to give concentrated solutions has energy advantages and the use of a stripping step alone to decompose bicarbonate has further advantages. In existing processes such as that illustrated in the Copenhafer patent, caustic must be used to convert essentially all of the bicarbonate to carbonate before crystallization can be conducted. Caustic is an expensive reagent even when it is produced from sodium carbonate and lime. Economic advantages are achieved by avoiding the use of caustic.

A crystallized stream 32 comprising a slurry of sodium carbonate decahydrate crystals and mother liquor exits the sodium carbonate decahydrate crystallizer 30 and is fed into a liquids-solids separator, such as a centrifuge 34. A bulk decahydrate crystal product is formed as product stream 36 having a composition of between about 33% and 37% sodium carbonate by weight, between about 0% and 0.3% sodium bicarbonate, between about 0% and 0.2% NaCl by weight, and between about 0% to 0.4% sodium sulfate by weight. Optionally, the sodium carbonate decahydrate crystals can be washed with cold water at this stage to further lower impurities. The sodium carbonate decahydrate crystals in the product stream 36 can be melted and converted, by known industry techniques, into various sodium salts including, but not restricted to: soda ash sodium bicarbonate, sodium sesquicarbonate, and caustic.

The sodium carbonate decahydrate crystals are preferably converted to soda ash by a monohydrate process by melting the sodium carbonate decahydrate crystals and directing the melted crystals to a sodium carbonate monohydrate processing plant wherein monohydrate crystals are formed by evaporation. The monohydrate crystals may be further dried to produce soda ash. The steam used and produced in the monohydrate process may be advantageously employed as the steam in this solution mining process, such as for the feed steam to trim heat exchangers and/or the feed steam to the stripping columns. Other processes using large quantities of steam, such as found in caustic evaporation trains, may be used to provide the steam to the solution mining process of the present invention.

The mother liquor which exits in centrifuged stream 38 may have a composition of between about 4% and 18% of sodium carbonate by weight, between about 1% and 4.5%, although typically, about 3.5 to 4.5% of sodium bicarbonate by weight, and small quantities of salt and sodium sulfate, for example, between about 0% and 15% by weight for each. A small amount of centrifuged stream 38 may be purged through centrifuged purge stream 40 to remove impurities. Depending on the concentration of carbonate and associated impurities, the centrifuged purge stream 40 may also have commercial uses such as $SO_2$ scrubbing or as a make-up or feed stock for a caustic soda process.

The centrifuged stream 38 is directed to a heat exchanger 42 where the temperature of the centrifuged stream 38 may be increased by heat exchange with a stripped centrifuged stream 44 from the stripping column 46 to a temperature near that of the operating temperature of the stripping column 46. The heated centrifuged stream 48 (which has the same chemical composition as centrifuged stream 38) is then directed into a trim heat exchanger 50. The temperature of the heated centrifuged stream 48 is increased in the trim heat exchanger 50 by heat exchange with a steam stream 52. The steam stream 52 exits the trim heat exchanger 50 as a condensate steam stream 54. The heated centrifuged stream 48 exits as hot centrifuged stream 56. The trim heat exchanger 50 is used to increase the temperature of the heated centrifuged stream 48 (resulting in a hot centrifuged stream 56) to a temperature approximately equal to that of the operating temperature of the stripping column 46 so that flashing and condensation may be avoided in the stripping column 46.

The hot centrifuged stream 56 is fed to the top of a stripping column 46 which has a stripping steam stream 58 directed into the bottom of the stripping column 46. The stripping column 46 is usually operated at between about 150° F. (65.6° C.) and 350° F. (176.7° C.). The stripping column 46 converts sodium bicarbonate in the hot centrifuged stream 56 to sodium carbonate by stripping off carbon dioxide. Steam and carbon dioxide exit through exhaust line stream 60. The exhaust line stream 60 is preferably used for heating elsewhere in the mining plant (for example, in a monohydrate crystallizer). The operating temperature for the stripping column 46 is preferably between about 210° F. (98.9° C.) and about 270° F. (132.2° C.). The stripping column 46 is operated such that the chemical composition of the stripped centrifuged stream 44 exiting the bottom of the stripping column 46 is usually as follows:

sodium carbonate: from between about 5% and 20% by weight;

sodium bicarbonate: up to about 4.5% by weight, preferably as low as possible between about 1% and 3% by weight;

sodium chloride: up to about 15% by weight; and sodium sulfate: up to about 15% by weight.

It is, of course, understood that the stripped centrifuged stream 44 may be treated with lime or caustic to further reduce the bicarbonate content which increases the carbonate content if desired (although, generally economically advantageous).

The flow within the stripping column 46, which is generally a packed column with ceramic packing or stainless steel packing, is performed in countercurrent fashion with the hot centrifuged stream 56 descending through the stripping column 46 while gaseous stripping steam stream 58 bubbles up through the stripping column 46. Ideally, no significant loss of water occurs in the stripping column 46. The stripped centrifuged stream 44, which exits from the bottom of the stripping column 46, is a carbonate-enriched bicarbonate depleted brine.

A portion of the stripped centrifuged stream 44 may be purged in stripped centrifuged purge stream 62 and diverted for other uses, such as the feed to a lime soda caustic plant. The stripped centrifuged stream 44 is directed through heat exchanger 42 to heat up the centrifuged stream 38, as discussed above. After being directed through the heat exchanger 42, the stripped centrifuged stream 44 becomes significantly cooler, usually slightly above the temperature of the centrifuged stream 38, to form recycle liquor stream 16. A portion of the recycle liquor stream 16 may be used as the reducer stream 26 for the bicarbonate reducer 24, as discussed above. Additionally, the recycle liquor stream 16 may be heated using waste heat before being recycled to the mine 10.

Furthermore, if desired, the recycle liquor stream 16 may be further treated to increase its utility as a solvent for trona dissolution. Such treatments could include the addition of alkalis such as lime or caustic soda. Generally, the addition of these reagents would not be economically justified, unless they were available at a reduced cost, e.g., as a waste stream from a nearby caustic soda plant.

The positioning of the stripping column 46 after the sodium carbonate decahydrate crystallizer 30 represents one of the unique features of the present invention. It has been found that this positioning allows the stripping operation to be more efficient than it would be if placed prior to the sodium carbonate decahydrate crystallizer 30. As previously discussed, the reduced brine stream 28 can be formed without needing to eliminate substantially all of the bicarbonate (e.g., by dilution). In fact, if dilution is employed as the bicarbonate reduction step in the bicarbonate reducer 24, essentially no bicarbonate is destroyed during the process prior to crystallization in the sodium carbonate decahydrate crystallizer 30. However, in order to minimize the effects of bicarbonate blinding in the mine 10, and in order to be able to recover the bicarbonate portion of the ore reserve in the mine (33% of the alkalinity value in trona), some bicarbonate decomposition must be performed. In the present invention, this is uniquely accomplished by steam stripping in the stripping column 46 after the crystallization of the sodium carbonate decahydrate in the sodium carbonate decahydrate crystallizer 30. Steam stripping is generally the most economical way to decompose bicarbonate in solution if the mining facility has substantial steam available, particularly if the facility has a sodium carbonate monohydrate processing plant.

The reason steam stripping after sodium carbonate decahydrate crystallization is more efficient than stripping at other places in the process is not obvious, but can be explained as follows. It has been pointed out in co-pending application Ser. No. 08/489,103 filed on Jun. 9, 1995 now U.S. Pat. No. 5,609,838 by the instant inventors, hereby incorporated herein by reference, that steam stripping works by removing carbon dioxide, thus lowering the partial pressure of carbon dioxide above the liquid in the stripping column 46 to below its equilibrium value, which then causes bicarbonate in solution to decompose, forming additional carbon dioxide and carbonate. Therefore, the difference between the equilibrium partial pressure of carbon dioxide and the actual partial pressure of carbon dioxide above the liquid in the stripping column 46 provides the driving force for the decomposition of bicarbonate. Thus, higher equilibrium partial pressures favor bicarbonate decomposition. It can be shown that the equilibrium partial pressure of carbon dioxide above a solution containing sodium carbonate and sodium bicarbonate (i.e., above the liquid in the stripping column 46) can be related to the carbonate and bicarbonate concentrations by the following expression.

$$P_{CO_2} = \frac{\gamma^2_{HCO_3^-}[HCO_3^-]^2 K_{a2}}{\gamma_{CO_3^{2-}}[CO_3^{2-}]K_{a1}K_H}$$

It can be seen from this expression that the equilibrium partial pressure of carbon dioxide above a solution containing carbonate and bicarbonate is proportional to the square of the bicarbonate activity (activity coefficient $\gamma$ times concentration) and inversely proportional to the carbonate activity (activity coefficient $\gamma$ times concentration). During crystallization in the sodium carbonate decahydrate crystallizer 30, carbonate is removed from the system. Additionally, water is removed. Both the crystallization and water removal increases the bicarbonate concentration in the liquid in the sodium carbonate decahydrate crystallizer 30. This results in an equilibrium partial pressure of carbon dioxide higher than that found for the reduced brine steam 28, and indicates bicarbonate decomposition is more easily accomplished after decahydrate crystallization. The effect is enhanced even more by the fact that the liquid mass is reduced after decahydrate crystallization, thereby reducing the liquid to gas ratio for a fixed gas flow rate. This will always result in more efficient stripping (see co-pending application Ser. No. 08/489,103 filed on Jun. 9, 1995 by the instant inventors, hereby incorporated herein by reference). Therefore, the instant invention allows for more efficient use of steam for stripping and decomposing bicarbonate than the processes described in the prior art.

The following Table 1 shows the material balance for the present invention operated with centrate recycle (i.e. a portion of the recycle liquor stream 16 being added as the reducer stream 26 to the bicarbonate reducer 24) and stream component percentages. The table is included so that the utility of the instant invention in longterm solution mining of trona ore will be evident.

TABLE 1

| Stream | TPH (tons per hour) | | | | |
|---|---|---|---|---|---|
| | Total | $Na_2CO_3$ | $NaHCO_3$ | NaCl | $Na_2SO_4$ |
| 12 | 83.0 | — | — | — | — |
| 20 (before purge stream 22) | 955.3 | 93.5 | 47.3 | 7.3 | 4.1 |
| 22 | 22.9 | 2.2 | 1.1 | 0.2 | 0.1 |
| 20 (after purge stream 22) | 932.4 | 91.3 | 46.2 | 7.1 | 4.0 |
| 26 | 773.6 | 56.6 | 15.8 | 7.3 | 4.0 |
| 28 | 1706.0 | 147.9 | 62.0 | 14.4 | 8.0 |
| 36 | 159.0 | 56.8 | 0.2 | 0.1 | 0.1 |
| 38 (before purge stream 40) | 1518.3 | 91.1 | 61.8 | 14.3 | 7.9 |
| 40 | 23.4 | 1.4 | 1.0 | 0.2 | 0.1 |
| 44 | 1487.6 | 108.9 | 30.4 | 14.1 | 7.8 |

TABLE 1-continued

| | | | | | |
|---|---|---|---|---|---|
| 16 | 714.0 | 52.3 | 14.6 | 6.8 | 3.8 |
| 18 | 153.1 | — | — | — | — |

| | % (percent of total) | | | |
|---|---|---|---|---|
| Stream | $Na_2CO_3$ | $NaHCO_3$ | NaCl | $Na_2SO_4$ |
| 12 | — | — | — | — |
| 20 (before purge stream 22) | 9.79 | 4.95 | 0.76 | 0.43 |
| 22 | 9.79 | 4.95 | 0.76 | 0.43 |
| 20 (after purge stream 22) | 9.79 | 4.95 | 0.76 | 0.43 |
| 26 | 7.32 | 2.04 | 0.95 | 0.52 |
| 28 | 8.67 | 3.63 | 0.84 | 0.47 |
| 36 | 35.72 | 0.13 | 0.04 | 0.10 |
| 38 (before purge stream 40) | 6.00 | 4.07 | 0.95 | 0.52 |
| 40 | 6.00 | 4.07 | 0.95 | 0.52 |
| 44 | 7.32 | 2.04 | 0.95 | 0.52 |
| 16 | 7.32 | 2.04 | 0.95 | 0.52 |
| 18 | — | — | — | — |

Thus, the process as outlined in FIG. 1 is both efficient and simple in its approach to the recovery of very pure decahydrate crystals from a brine stream produced by solution mining of a bicarbonate containing ore deposit.

Having thus described in detail preferred embodiments of the present invention, it is to be understood that the invention defined by the appended claims is not to be limited by particular details set forth in the above description as many apparent variations thereof are possible without departing from the spirit or scope thereof.

What is claimed is:

1. A method of producing sodium carbonate decahydrate from liquors containing sodium bicarbonate derived from the dissolution in situ of an underground carbonate ore deposit containing sodium bicarbonate values, comprising:
   a) contacting said ore deposit with an aqueous solution containing sodium carbonate to produce a sodium bionate enriched feed brine in which the sodium bicarbonate and sodium carbonate content is such that cooling of such sodium bicarbonate enriched feed brine to precipitate crystals in subsequent of step c) would result in the formation of sodium bicarbonate or sodium sesquicarbonate crystals instead of or in addition to sodium carbonate decahydrate crystals;
   b) adjusting the concentration of sodium bicarbonate in said sodium bicarbonate enriched brine stream to form a brine stream of such a composition that it will not precipitate sodium sesquicarbonate or sodium bicarbonate upon cooling in the subsequent cooling sodium carbonate decahydrate crystallization of step c) and will precipitate essentially only sodium carbonate decahydrate in the subsequent cooling sodium carbonate decahydrate crystallization of step c);
   c) cooling said brine stream of step b) to precipitate sodium carbonate decahydrate crystals, terminating the crystallization before significant sodium bicarbonate or sodium sequicarbonate precipitation occurs, and yielding a slurry of said crystals in a mother liquor;
   d) separating said sodium carbonate decahydrate crystals from said mother liquor;
   e) steam stripping said mother liquor to convert a portion of said sodium bicarbonate to sodium carbonate to yield a carbonate enriched, bicarbonate deplete aqueous solution; and
   f) recycling at least a portion of said carbonate enriched, bicarbonate deleted aqueous solution to form at least part of said aqueous solution which contacts said ore deposit.

2. The method of claim 1, wherein said sodium bicarbonate enriched feed brine stream of step a) comprises between about 7% and 18% by weight sodium carbonate and between about 3% and 12% by weight sodium bicarbonate.

3. The method of claim 1, wherein said brine stream of step b) contains between about 1% and 4.5% by weight sodium bicarbonate.

4. The method of claim 3, wherein said brine stream of step b) comprises between about 3% and 4% by weight sodium bicarbonate.

5. The method of claim 1, wherein adjusting the concentration of sodium bicarbonate in said sodium bicarbonate enriched feed brine stream to form a brine stream comprises neutralizing a portion of the bicarbonate value of said sodium bicarbonate enriched feed brine stream with a caustic soda solution, or solutions or slurries of alkaline compounds.

6. The method of claim 1, wherein adjusting the concentration of sodium bicarbonate in said sodium bicarbonate enriched feed brine stream to form a brine stream comprises adding water to said sodium bicarbonate enriched feed brine stream.

7. The method of claim 1, wherein adjusting the concentration of sodium bicarbonate in said sodium bicarbonate enriched feed brine stream to form a brine stream comprises addition of a portion of said carbonate enriched, bicarbonate depleted aqueous solution of step e) to said sodium bicarbonate enriched feed brine stream.

8. The method of claim 1, wherein the adjusting of step b) comprises steam stripping said sodium bicarbonate enriched feed brine stream to convert a portion of said sodium bicarbonate to sodium carbonate.

9. The method of claim 1, wherein cooling said brine stream includes lowering the temperature of said brine stream to below about 20° C.

10. The method of claim 1, wherein said mother liquor of step d) comprises between about 4% and 18% sodium carbonate by weight and between about 1% and 4.5% sodium bicarbonate by weight.

11. The method of claim 10, wherein said mother liquor of step d) comprises between about 3.5% and 4.5% sodium bicarbonate by weight.

12. The method of claim 1, wherein said carbonate enriched, bicarbonate depleted aqueous solution of step e) comprises between about 5% and 20% by weight sodium carbonate and between about 0% and 4.5% by weight sodium bicarbonate.

13. The method of claim 12, wherein said carbonate enriched, bicarbonate depleted aqueous solution of step e) comprises between about 1% and 3% by weight sodium bicarbonate.

14. The method of claim 1, wherein said underground carbonate ore deposit is trona.

15. The method of claim 1, wherein steam stripping said mother liquor of step e) converts a substantial portion of said sodium bicarbonate to sodium carbonate to yield said carbonate enriched, bicarbonate depleted aqueous solution.

16. The method of claim 1, wherein steam stripping said mother liquor of step e) is effected by steam generated externally from said method of producing sodium carbonate decahydrate.

17. The method of claim 1, wherein steam stripping said mother liquor of step d) is effected by steam generated externally from said method of producing sodium carbonate decahydrate.

18. A method of producing sodium carbonate decahydrate from liquors containing sodium bicarbonate derived from the dissolution in situ of an underground carbonate ore deposit containing sodium bicarbonate values, comprising:

a) contacting said ore deposit with an aqueous solution containing sodium carbonate to produce a sodium bicarbonate enriched feed brine in which the sodium bicarbonate and sodium carbonate content is such that cooling of such enriched feed brine to precipitate crystals in subsequent step b) will not result in the formation of sodium bicarbonate or sodium sesquicarbonate crystals instead of or in addition to sodium carbonate decahydrate crystals;

b) cooling said sodium bicarbonate enriched feed brine stream of step a) to precipitate sodium carbonate decahydrate crystals, terminating the crystallization before significant sodium bicarbonate or sodium sequicarbonate precipitation occurs, and yielding a slurry of said crystals in a mother liquor;

c) separating said sodium carbonate decahydrate crystals from said mother liquor;

d) steam stripping said mother liquor to convert a portion of said sodium bicarbonate to sodium carbonate to yield a carbonate enriched, bicarbonate depleted aqueous solution; and e) recycling at least a portion of said carbonate enriched, bicarbonate depleted aqueous solution to form at least part of said aqueous solution which contacts said ore deposit.

19. The method of claim 18, wherein said sodium bicarbonate enriched brine feed steam of step a) contains at least 1% by weight sodium bicarbonate.

20. The method of claim 19, wherein said sodium bicarbonate enriched brine feed stream of step a) comprises between about 3% and 4% by weight sodium bicarbonate.

21. The method of claim 18, wherein cooling said sodium bicartonate enriched feed brine stream of step a) includes lowering the temperature of said reduced brine stream to below about 20° C.

22. The method of claim 18, wherein said mother liquor of step c) comprises between about 4% and 18% sodium carbonate by weight and between about 1% and 4.5% sodium bicarbonate by weight.

23. The method of claim 22, wherein said mother liquor of step c) comprises between about 3.5% and 4.5% sodium bicarbonate by weight.

24. The method of claim 18, wherein said carbonate enriched, bicarbonate depleted aqueous solution of step d) comprises between about 5% and 20% by weight sodium carbonate and between about 0% and 4.5% by weight sodium bicarbonate.

25. The method of claim 24, wherein said carbonate enriched, bicarbonate depleted aqueous solution of step d) comprises between about 1% and 3% sodium bicarbonate.

26. The method of claim 18, wherein said underground carbonate ore deposit is trona.

27. The method of claim 18, wherein steam stripping said mother liquor of step d) converts a substantial portion of said sodium bicarbonate to sodium carbonate to yield said carbonate enriched, bicarbonate depleted aqueous solution.

28. A method of producing sodium carbonate decahydrate from liquors containing sodium bicarbonate derived from the dissolution in situ of an underground carbonate ore deposit containing sodium bicarbonate values, consisting essentially of:

a) contacting said ore deposit with an aqueous solution containing sodium carbonate to produce a sodium bicarbonate enriched feed brine in which the sodium bicarbonate and sodium carbonate content is such that cooling of such sodium bicarbonate enriched feed brine to precipitate crystals in subsequent step c) would result in the formation of sodium bicarbonate or sodium sesquicarbonate crystals instead of or in addition to sodium carbonate decahydrate crystals;

b) adjusting the concentration of sodium bicarbonate in said sodium bicarbonate enriched brine stream to form a brine stream of such a composition that it will not precipitate sodium sesquicarbonate or sodium bicarbonate upon cooling in the subsequent cooling sodium carbonate decahydrate crystallization of step c) and will precipitate essentially only sodium carbonate decahydrate in the subsequent cooling sodium carbonate decahydrate crystallization of step c);

c) cooling said brine stream of step b) to precipitate sodium carbonate decahydrate crystals, terminating the crystallization before significant sodium bicarbonate or sodium sequicarbonate precipitation occurs, and yielding a slurry of said crystals in a mother liquor;

d) separating said sodium carbonate decahydrate crystals from said mother liquor;

e) steam stripping said mother liquor to convert a portion of said sodium bicarbonate to sodium carbonate to yield a sodium bicarbonate depleted aqueous solution; and f) recycling at least a portion of said sodium bicarbonate depleted aqueous solution to form at least part of said aqueous solution which contacts said ore deposit.

29. A method of producing sodium carbonate decahydrate from liquors containing sodium bicarbonate derived from the dissolution in situ of an underground carbonate ore deposit containing sodium bicarbonate values, consisting essentially of:

a) contacting said ore deposit with an aqueous solution containing sodium carbonate to produce a sodium bicarbonate enriched feed brine in which the sodium bicarbonate and sodium carbonate content is such that cooling of such enriched feed brine to precipitate crystals in subsequent step b) will not result in the formation of sodium bicarbonate or sodium sesquicabonate crystals instead of or in addition to sodium carbonate decahydrate crystals;

b) cooling said sodium bicarbonate enriched feed brine stream of step a) to precipitate sodium carbonate decahydrate crystals, terminating the crystallization before significant sodium bicarbonate or sodium sequicarbonate precipitation occurs, and yielding a slurry of said crystals in a mother liquor;

c) separating said sodium carbonate decahydrate crystals from said mother liquor;

d) steam stripping said mother liquor to convert a portion of said sodium bicarbonate to sodium carbonate to yield a carbonate enriched, bicarbonate depleted aqueous solution; and e) recycling at least a portion of said carbonate enriched, bicarbonate depleted aqueous solution to form at least part of said aqueous solution which contacts said ore deposit.

* * * * *

UNITED STATES PATENT AND TRADEMARK OFFICE
CERTIFICATE OF CORRECTION

PATENT NO. : 5,955,043
DATED : September 21, 1999
INVENTOR(S) : Thomas H. Neuman and Richard W. Chastain It is certified that error appears in the above-identified patent and that said Letters Patent is hereby corrected as shown below:

Title page,
OTHER PUBLICATIONS, (5$^{th}$ entry) change "1843" to -- 1873 --

Column 1,
Line 32, change "($Na_2CO_3.NaHCO_3.2H_2O$)" to -- ($Na_2CO_3 \cdot NaHCO_3 \cdot 2H_2O$) --
Line 42, delete "since"

Column 2,
Line 60, after "solution" insert -- , --
Line 64, after "Therefore" insert -- , --
Line 65, change "long term" to -- long-term --

Column 3,
Line 52, after "Miller" insert -- , --
Line 57, change "carbonate rich" to -- carbonate-rich --

Column 4,
Line 13, after "problems" delete ","
Line 26, change "form" to -- forms --
Line 49, after "brines" insert -- , --
Line 62, after "contaminating" delete ","

Column 5,
Lines 29-30, after "recompression" insert -- (MVR) --
Line 38, after "and" insert -- , -- and after "therefore" insert -- , --

Column 6,
Line 43, after "deposit" insert -- , --

Column 7,
Line 58, change "($Na_2CO_3.NaHCO_3.2H_2O$)" to -- ($Na_2CO_3 \cdot NaHCO_3 \cdot 2H_2O$) --

Column 8,
Line 43, after "operation" delete ","
Line 46, after "dissolution" delete ","
Line 55, after "complete" delete ","

UNITED STATES PATENT AND TRADEMARK OFFICE
CERTIFICATE OF CORRECTION

PATENT NO.   : 5,955,043
DATED        : September 21, 1999
INVENTOR(S)  : Thomas H. Neuman and Richard W. Chastain It is certified that error appears in the above-identified patent and that said Letters Patent is hereby corrected as shown below:

Column 9,
Line 24, after "surface" delete ","
Line 46, after "liquor" insert -- stream --
Line 53, change "alkallinty" to -- alkalinity --

Column 10,
Line 40, after "like" insert -- , --
Line 44, after "water stream" delete ","
Line 52, after "step" delete ","
Line 65, change "diluted" to -- dilute --

Column 11,
Line 44, after "mine 10" delete ","

Column 12,
Line 8, change "dehydrate" to -- decahydrate --

Column 13,
Line 62, after "to" delete ":" and insert -- , -- therefor

Column 14,
Line 14, after "typically" delete "," and insert -- between --

Column 16,
Line 32, change "steam" to -- stream --
Line 45, after "(i.e.," insert -- , --
Line 49, change "longterm" to -- long-term --

Column 17,
Line 37, change "bionate" to -- bicarbonate --
Line 39, change "such" to -- said --
Line 40, delete "of"
Line 41, delete "the" and after "bicarbonate" insert -- crystals --
Line 45, after "enriched" insert -- feed -- and delete "stream"
Line 57, change "sodium sequicarbonate" to -- said sodium sesquicarbonate --
Line 63, change "deplete" to -- depleted --
Line 66, change "deleted" to -- depleted --

UNITED STATES PATENT AND TRADEMARK OFFICE
CERTIFICATE OF CORRECTION

PATENT NO.   : 5,955,043
DATED        : September 21, 1999
INVENTOR(S)  : Thomas H. Neuman and Richard W. Chastain It is certified that error appears in the above-identified patent and that said Letters Patent is hereby corrected as shown below:

Column 18,
Line 2, delete "stream"
Line 11, after "wherein" insert -- said --
Line 13, delete "stream" (1$^{st}$ occurrence)
Line 14, after "the" insert -- sodium --
Line 18, after "wherein" insert -- said --
Line 20, delete "stream" (1$^{st}$ occurrence)
Line 23, after "wherein" insert -- said --
Line 25, delete "stream" (1$^{st}$ occurrence)
Line 33, after "wherein" insert -- said --
Line 54, after "wherein" insert -- said --
Line 58, after "wherein" insert -- said --
Line 62, after "wherein" insert -- said --
Line 63, change "d)" to -- e) --

Column 19,
Line 7, delete "such" and insert -- said sodium bicarbonate -- therefor
Line 9, after "bicarbonate" insert -- crystals --
Line 13, delete "stream"
Line 16, change "sequicarbonate" to -- sesquicarbonate --
Line 29, change "brine feed stream" to -- feed brine --
Line 32, change "brine feed stream" to -- feed brine --
Line 34, after "wherein" insert -- said --
Line 35, change "bicartonate" to -- bicarbonate -- and delete "stream"
Line 36, change "the temperature of said reduced brine stream to" to -- a temperature of said sodium bicarbonate enriched feed brine to --
Line 56, after "wherein" insert -- said --

UNITED STATES PATENT AND TRADEMARK OFFICE
CERTIFICATE OF CORRECTION

PATENT NO. : 5,955,043
DATED : September 21, 1999
INVENTOR(S) : Thomas H. Neuman and Richard W. Chastain It is certified that error appears in the above-identified patent and that said Letters Patent is hereby corrected as shown below:

Column 20,
Line 3, delete "such" and insert -- said -- therefor
Line 5, after "bicarbonate" insert -- crystals --
Line 9, after "enriched" insert -- feed -- and delete "stream"
Line 20, change "sequicarbonate" to -- sesquicarbonate --
Line 40, delete "such" and insert -- said sodium bicarbonate -- therefor
Line 42, after "bicarbonate" insert -- crystals --
Lines 42-43, change "sesquicabonate" to -- sesquicarbonate --
Line 46, delete "stream"
Line 49, change "sequicarbonate" to -- sesquicarbonate --

Signed and Sealed this

Second Day of July, 2002

Attest:

JAMES E. ROGAN
Attesting Officer
Director of the United States Patent and Trademark Office